US011943370B2

(12) United States Patent
Weeden et al.

(10) Patent No.: US 11,943,370 B2
(45) Date of Patent: Mar. 26, 2024

(54) USING DEVICE-BOUND CREDENTIALS FOR ENHANCED SECURITY OF AUTHENTICATION IN NATIVE APPLICATIONS

(71) Applicant: International Business Machines Corporation, Armonk, NY (US)

(72) Inventors: Shane Bradley Weeden, Paradise Point (AU); Craig Pearson, Robina Town Centre (AU); Carsten Hagemann, Ashmore (AU)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 17/523,743

(22) Filed: Nov. 10, 2021

(65) Prior Publication Data
US 2023/0141966 A1 May 11, 2023

(51) Int. Cl.
*H04L 29/06* (2006.01)
*G06F 21/62* (2013.01)
(Continued)

(52) U.S. Cl.
CPC .......... *H04L 9/3247* (2013.01); *G06F 21/629* (2013.01); *H04L 9/14* (2013.01); *H04L 63/166* (2013.01)

(58) Field of Classification Search
None
See application file for complete search history.

(56) References Cited

U.S. PATENT DOCUMENTS 9,172,693 B2 10/2015 Griffin
10,764,752 B1 * 9/2020 Avetisov ............... H04W 12/08
(Continued)

FOREIGN PATENT DOCUMENTS

CN 112136303 A 12/2020
WO 2020166066 A1 8/2020
(Continued)

OTHER PUBLICATIONS

Spoorthi, V.; Sekaran, K. Chandra. Mobile single sign-on solution for enterprise cloud applications. 2014 First International Conference on Networks & Soft Computing (ICNSC2014). https://ieeexplore.ieee.org/stamp/stamp.jsp?tp=&arnumber=6906717 (Year: 2014).*
(Continued)

*Primary Examiner* — Jeremiah L Avery
(74) *Attorney, Agent, or Firm* — Mark Bergner

(57) ABSTRACT

A method allows access to computer resources to authorized native applications on a client device. An authorization server receives, from a native application on a device, an initial authorization grant, a public key of a private/public key pair generated on the device, and an attestation of authenticity of the native application. The authorization server receives, from the native application on the device, a refresh token and a digital signature of the refresh token that is created with the private key. The authorization server recognizes the refresh token only if the refresh token is verified with the public key that has been previously registered. The authorization server validates the digital signature of the refresh token, and transmits a new access token and a new refresh token to the native application on the device, thus allowing the native application on the device to access the computer resource.

19 Claims, 9 Drawing Sheets

(51) Int. Cl.
*H04L 9/14* (2006.01)
*H04L 9/32* (2006.01)
*H04L 9/40* (2022.01)

(56) References Cited

U.S. PATENT DOCUMENTS

| | | | |
|---|---|---|---|
| 10,904,234 B2 | 1/2021 | Ross | |
| 11,409,820 B1* | 8/2022 | Gutierrez | G06F 16/9538 |
| 2019/0334884 A1* | 10/2019 | Ross | G06F 21/41 |
| 2019/0364035 A1 | 11/2019 | Smolny | |
| 2019/0394187 A1* | 12/2019 | Fletcher | H04L 63/0815 |
| 2020/0036707 A1* | 1/2020 | Callahan | H04L 67/53 |
| 2020/0067907 A1* | 2/2020 | Avetisov | H04L 63/12 |
| 2020/0153831 A1 | 5/2020 | Baer | |
| 2020/0344233 A1* | 10/2020 | Lai | G06Q 20/4014 |
| 2020/0374121 A1 | 11/2020 | Momchilov | |
| 2021/0044976 A1* | 2/2021 | Avetisov | G06F 21/64 |
| 2021/0168090 A1* | 6/2021 | Momchilov | H04L 47/36 |
| 2021/0288808 A1 | 9/2021 | Bahety | |
| 2022/0021538 A1* | 1/2022 | Madisetti | H04L 63/105 |
| 2022/0045841 A1* | 2/2022 | Keith, Jr. | G06V 40/20 |
| 2022/0272117 A1* | 8/2022 | Maheve | H04L 63/1416 |
| 2022/0303268 A1* | 9/2022 | Karnaros | G06F 21/36 |
| 2023/0351371 A1* | 11/2023 | Cella | G06Q 20/223 |

FOREIGN PATENT DOCUMENTS

| | | |
|---|---|---|
| WO | 2021216346 A1 | 10/2021 |
| WO | 2023082833 A1 | 5/2023 |

OTHER PUBLICATIONS

Chen, Biwen et al. A Blockchain-Based Searchable Public-Key Encryption With Forward and Backward Privacy for Cloud-Assisted Vehicular Social Networks. IEEE Transactions on Vehicular Technology, vol. 69, Issue: 6. https://ieeexplore.ieee.org/stamp/stamp.jsp?tp=&arnumber=8931643 (Year: 2020).*

Yang, Wenil et al. A Survey on Blockchain-Based Internet Service Architecture: Requirements, Challenges, Trends, and Future. IEEE Access, vol. 7. https://ieeexplore.ieee.org/stamp/stamp.jsp?tp=&arnumber=8717702 (Year: 2019).*

Sucasas, Victor et al. An OAuth2-based protocol with strong user privacy preservation for smart city mobile e-Health apps. 2016 IEEE International Conference on Communications (ICC). https://ieeexplore.ieee.org/stamp/stamp.jsp?tp=&arnumber=7511598 (Year: 2016).*

Biometric login for web apps using WebAuthn, Mar. 30, 2021.

D. Fett et al, OAuth 2.0 Demonstrating Proof-of-Possession of the Application Layer (DPoP), 2021 IETF TRust, Oct. 4, 2021.

OAuth 2.0 Client Authentication, Jul. 18, 2019.

OAuth 2.0 Threat Model and Security Considerations, Lodderstedt et al., IETF, Jan. 2013.

OAuth 2.0 Token Binding, Jul. 3, 2017.

OAuth 2.0 Token Binding draft-eitf-oauth-token-binding-08, Jones et al., Oct. 19, 2018.

Using Mobile Device IDs as additional factor of authentication (something you have), Oct. 14, 2017.

NIST Definition of Cloud Computing, Sep. 2011.

Anonymous, "Token binding explained", Connect2id, downloaded from the Internet on Nov. 30, 2022, 6 pages, <https://connect2id.com/learn/token-binding>.

Denniss et al., "OAuth 2.0 for Native Apps", Oct. 2017, 20 pages, <https://www.rfc-editor.org/rfc/rfc8252.txt>.

Patent Cooperation Treaty, Notification of Transmittal of the International Search Report and the Written Opinion of the International Searching Authority, or the Declaration, dated Nov. 25, 2022, International application No. PCT/CN2022/119054, 9 pages.

* cited by examiner

USING DEVICE-BOUND CREDENTIALS FOR ENHANCED SECURITY OF AUTHENTICATION IN NATIVE APPLICATIONS

BACKGROUND

The present invention relates to securing computer resources. More specifically, one or more embodiments of the present invention provides secure access to a particular computer resource. Still more specifically, one or more embodiments of the present invention provide a new and useful solution for ensuring that refresh tokens presented by a native application during Open Authorization (OAuth) refresh are sent from the same device to which they were issued.

SUMMARY

In one or more embodiments of the present invention, an authorization server receives, from a native application on a device, an initial authorization grant, a public key of a private/public key pair generated on the device, and an attestation of authenticity of the native application. The authorization server receives, from the native application on the device, a refresh token and a digital signature of the refresh token that is created with the private key, where the authorization server recognizes the refresh token only if the refresh token is verified with the public key that has been previously registered. The authorization server validates the digital signature of the refresh token. In response to validating the refresh token from the native application on the device, the authorization server transmits a new access token and a new refresh token to the native application on the device, such that the new access token allows the native application on the device to access the computer resource.

In one or more embodiments, the method(s) described herein are performed by an execution of a computer program product on a computer system.

DETAILED DESCRIPTION

Figure 1:
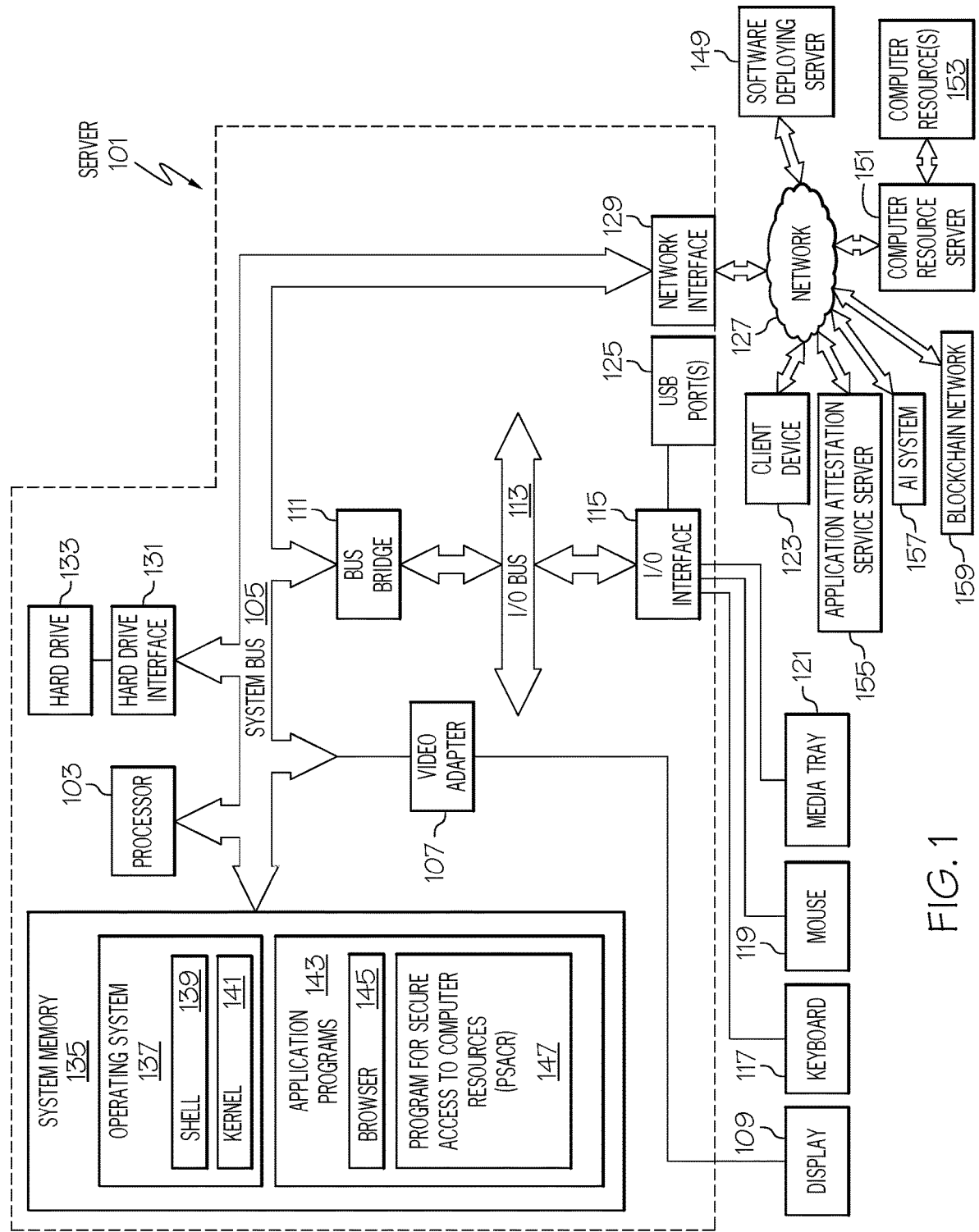
FIG. 1 depicts an exemplary system and network in which the present disclosure may be implemented.

As described herein, one or more embodiments of the present invention utilize device-bound Public Key Infrastructure (PKI) credentials to sign an Open Authorization (OAuth) refresh token in the refresh token message payload. As such, and in one or more embodiments of the present invention, registration of the public key of a credential pair is performed during initial grant establishment, and the addition of a signature over the refresh token is provided during any subsequent refresh token flow.

One or more embodiments of the present invention leverage patterns such as Fast Identity Online (FIDO) to establish a device-bound keypair including the attestation of such a keypair, and does not require anything other than application-level payloads (i.e. no Transport Layer Security—TLS extensions).

In one or more embodiments of the present invention in which an OAuth system is utilized, a FIDO assertion payload, using the refresh token itself as the challenge, is added to the refresh token payload parameters and validated at the server to ensure the signature is performed with a key that was previously registered in a device-bound manner.

Such OAuth systems provide an identity security pattern in native applications, such that a user participates in a registration ceremony after installing an application to establish a long-lived OAuth grant (first refresh token and access token) for the application to act as that user when calling Application Programming Interfaces (APIs) to a computer resource, such as data, programs, hardware, etc.

An exemplary OAuth registration process for a user begins with the user entering a user profile (e.g., name, address, etc.) for initial identification. In one or more registration scenarios, Multi-Factor Authentication (MFA) is used, in which the user not only provides a password, but also biometric information (e.g., the user's fingerprint); a current location the user, as determined by a Global Positioning System (GPS) sensor in an electronic device used by the user, a current communication connection to a particular cell tower in a cellular network, etc.; access to a security token, such as a dongle that generates ever-changing characters known to be valid at a current time by a security system, etc.

Once the user enters his/her/their user profile, MFA credentials, etc., this information is exchanged for an initial OAuth grant from an authorization server.

A native application may launch a system browser on the device where user authenticates via browser-based mechanisms to initiate an authorization code grant type flow or a native application may offer this functionality built into the application itself for an initial OAuth grant. The native application honors any redirect Uniform Resource Identifier (URI) that is a registered custom launch URI for the app.

The user authenticates on another device browser (e.g., on a laptop) and is presented with a Quick Response (QR) code, which contains the authorization code, such that the native application can scan the QR code.

Regardless of the specific flow (those described above or similar variants), an initial grant is established for the application on the device. The refresh token is then stored in app-specific secure storage to prevent disclosure to other apps.

After registration, whenever the native application on the device (e.g., a mobile device, such as a smart phone) needs a new access token for calling APIs, a refresh token flow is performed by the native application making a call to the authorization server's token endpoint. Only the refresh token itself serves to identify the grant being refreshed.

The problem with the OAuth process just described, which one or more embodiments of the present invention overcome in a new and useful manner, is that there is no proof provided that the refresh token is being presented from the device to which it was originally issued. As such, without the present invention the authentication server is unable to determine/distinguish a scenario in which the refresh token has been compromised from the device, native application, and/or network, such that the refresh token is being presented from a different device or program.

In order to address this issue, one or more embodiments of the present invention have the native application use an asymmetric device-bound credential that the application creates during the registration phase, to sign the refresh token each time a refresh token flow is performed. By ensuring that the signing operation can only take place on the device where the grant is initially established, the server has a much higher level of confidence that the OAuth grant is being used by the application on the device to which it was issued.

One or more embodiments of the present invention provide a clear improvement over token binding. Token binding uses cryptographic certificates, but requires the use of a Transport Layer Security (TLS) extension, in order to obtain cryptographic certificates on both ends of a TLS connection (e.g., between a client and an authorization server). As such, user instrumentation of such a system requires a high level of expertise, time, and computer resources, which the present invention does not require. Furthermore, token binding does not mandate that the credential created at the client be device-bound, thus making it less secure. As such, one or more embodiments of the present invention provide a resource security solution that is at the application data level (e.g., using extra parameters in OAuth payloads), and is not dependent on token binding implementations in TLS.

At a high level, one or more embodiments of the present invention have two phases: a Registration Phase and a Subsequent Grant Refresh.

Registration Phase

During registration, the native application receives or collects "initial grant data" from the user. In one or more embodiments of the present invention, this initial grant data is Resource Owner Password Credentials (ROPC) user authentication information, such as a username/password, which is supplied to the native application on the client device via a user interface.

In one or more embodiments of the present invention, this initial grant data is an authorization code that was obtained either from a handoff (custom launch URI invocation) from the system browser, or scanned in via QR code.

Before the native application sends this initial grant data to the token endpoint to obtain its first authorization grant, the native application creates a local device-bound public/private key credential.

In one or more embodiments of the present invention, the device's operating system offers Fast Identity Online—2 (FIDO2) platform authenticator Application Program Interfaces (APIs), which are used to create the credential.

In one or more embodiments of the present invention, platform APIs (e.g. the Secure Enclave APIs) create the credential.

The credential that is created may or may not require user verification to be created and used. This choice comes down to the security requirements (policy) of the company offering API services and the desired user experience. In Fast Identity Online (FIDO) terminology and specifications, user verification is optional, and that remains so in the ideas described herein.

Having created the keypair, the native application then constructs a FIDO attestationObject, which is included with the initial grant data in a request to the OAuth token endpoint in the authentication server. In one or more embodiments of the present invention, a packed attestation format is used, such that the clientDataJSON that is input to the creation of the attestation object is the initial grant data (in lieu of a server-provided challenge).

In one or more embodiments of the present invention, the attestation private key is embedded into the native application source itself. Protection of the attestation private key is performed using a technology such as white-box encryption and secure native code distribution practices.

One or more embodiments of the present invention utilize an attestation protocol, such as FIDO2 attestation.

An attestation, such as FIDO2 attestation, provides a proof to the authentication server of the make/model of the client authenticator that was used. In the case of a native application functioning as the client authenticator, this is attesting to the integrity of the application by identifying the vendor and version of the native application is that specified by the application developer, such that the application is trusted to be doing what it was coded to do.

In one or more embodiments of the present invention, the authentication server must be able to prove that the credential being created, which will be used to sign refresh token flows, is device-bound, such that the private key is only used on the device where it is established. Without such an attestation, the server doesn't know that the client communicating with it is a legitimate installation of the application. If the application is using native FIDO2 APIs provided by the operating system of the client device, the attestation is provided by the platform. If not, the attestation is supplied in the native application code.

The native application then presents the initial grant data, the attestationObject (which includes the public key of the device-bound credential) and the signature of the initial grant data (to verify the public key) to the token endpoint of the OAuth authorization server.

The OAuth authorization server verifies the attestation using pre-configured metadata that includes the trusted signer of the attestation private key. This verification includes checking that the authenticator data in the attestation object indicates user verification was performed if that is the policy of the server. The initial grant data is also verified. The public key of the device-bound credential is associated server-side with the OAuth grant, and the initial refresh token and access token are returned to the native application client.

Subsequent Grant Refresh

From time to time the native application will perform new refresh token flows as access tokens expire. In one or more embodiments of the present invention, the refresh token flow includes, alongside the refresh token, FIDO authenticatorData and a signature (of the hash of the refresh token), performed using the private key of the device-bound credential that was registered during initial grant establishment. This provides a proof to the server on each refresh that the request was generated at the device from which the grant was established. The clientDataJSON that is described in FIDO authentication documentation includes the refresh token instead as the server-provided challenge.

In one or more embodiments of the present invention, the refresh token is given a unique type. Exemplary pseudocode for the clientDataJSON is:

```
{
"type": "urn:mycustomapp:oauth",
"refresh_token": "RT_value"
}
```

As such, there is no need for the WebAuthn-defined challenge, origin, or tokenBinding fields.

The entire refresh token flow post body then is described as:
POST/oauth/token
client_id=public_client&grant_type=refresh_token&refresh_token=RT_value&authenticatorData=b64url_authenticator_data&signature=b64url_sig The authentication server ensures that the RT value is valid and represents a refresh token (RT) known to the server. The authentication server looks up the associated public key that was registered for the grant at grant establishment (this becomes the allowCredentials list in FIDO terminology), then makes sure that the rest of the validation procedure in Verifying an Authentication Assertion is successful with some minor considerations given to data values (such as origin, which in one or more embodiments of the present invention is a Uniform Resource Name—URN) since this is a native scenario rather than a browser with pure WebAuthn.

In one or more embodiments of the present invention, and in order to prevent application-level Man In The Middle (MITM) attacks, other mitigations such as certificate pinning are also employed as part of the overall solution.

With reference now to the figures, and in particular to FIG. 1, there is depicted a block diagram of an exemplary system and network that may be utilized by and/or in the implementation of one or more embodiments of the present invention. Note that some or all of the exemplary architecture, including both depicted hardware and software, shown for and within server 101 may be utilized by client device 123 and/or software deploying server 149 and/or computer resource server 151 and/or computer resource(s) 153 and/or application attestation service server 155 and/or artificial intelligence (AI) system 157 and/or blockchain network 159 shown in FIG. 1, and/or by resource owner 200 and/or authorization server 201 and/or client device 223 and/or computer resource server 251 and/or computer resource(s) 253 and/or application attestation service server 255 shown in FIG. 2, and/or other processing devices depicted in other figures associated with one or more embodiments of the present invention.

Exemplary server 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113 I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, server 101 is able to communicate with a network 127 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 135 which is also coupled to system bus 105. System memory is defined as the lowest level of volatile memory in server 101. This volatile memory includes additional higher levels of volatile memory (not shown), including, but not limited to, cache memory, registers and buffers. Data that populates system memory 135 includes server 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, one or more embodiments of the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., server 101) to send and receive network messages to the Internet using hypertext transfer protocol (HTTP) messaging, thus enabling communication with client device 123 and/or software deploying server 149 and/or computer resource server 151 and/or computer resource(s) 153 and/or application attestation service server 155 and/or other computer systems.

Application programs 143 in server 101's system memory also include a Program for Secure Access to Computer Resources (PSACR) 147. PSACR 147 includes code for implementing the processes described below, including those described in FIGS. 2-7. In one or more embodiments of the present invention, server 101 is able to download PSACR 147 from software deploying server 149, including in an on-demand basis, wherein the code in PSACR 147 is not downloaded until needed for execution. Note further that, in one or more embodiments of the present invention, software deploying server 149 performs all of the functions associated with the present invention (including execution of PSACR 147), thus freeing server 101 from having to use its own internal computing resources to execute PSACR 147.

Note that the hardware elements depicted in server 101 are not intended to be exhaustive, but rather are representative to highlight essential components required by one or more embodiments of the present invention. For instance, server 101 may include alternate memory storage devices such as magnetic cassettes, digital versatile disks (DVDs), Bernoulli cartridges, and the like. These and other variations are intended to be within the spirit and scope of the present invention.

Figure 2:
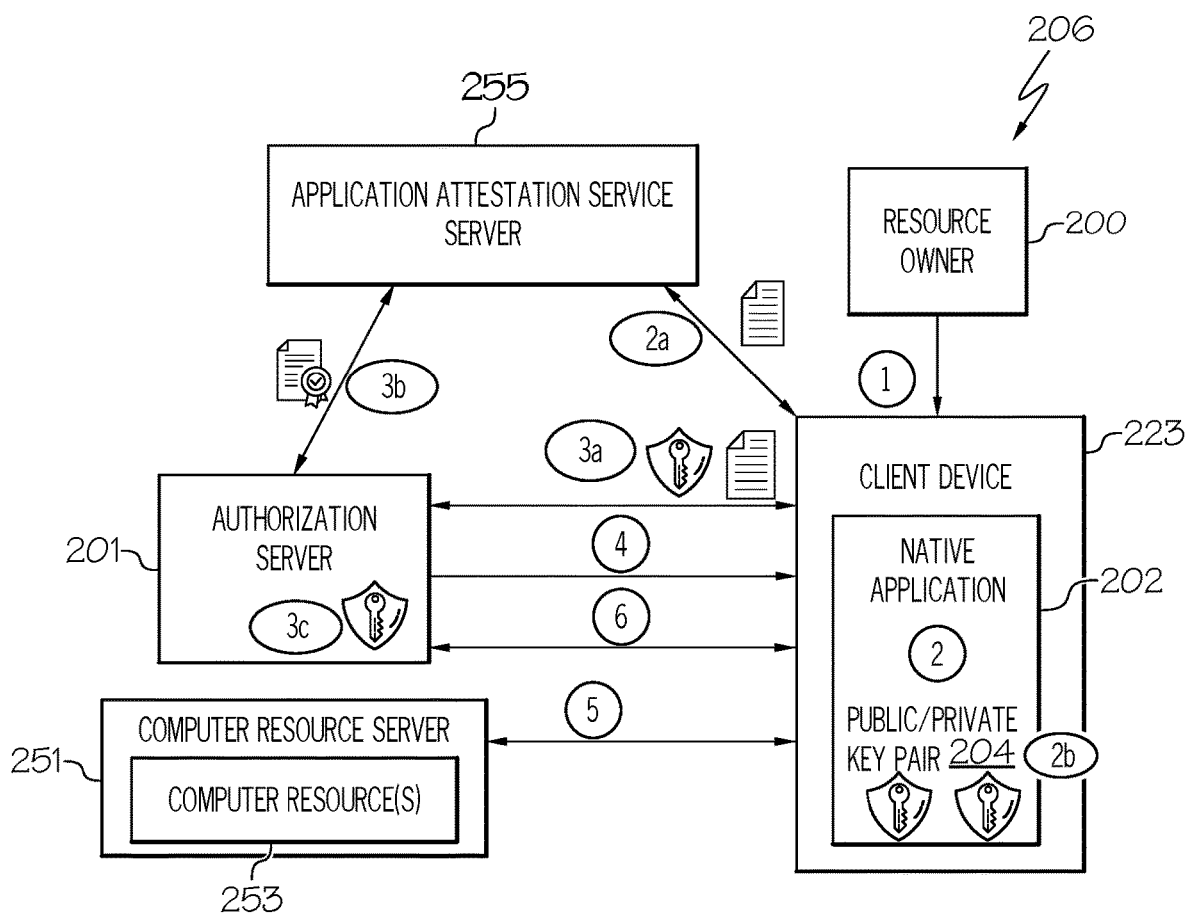
FIG. 2 illustrates a high-level overview of one or more embodiments of the present invention executed within an Open Authorization (OAuth) system.

With reference now to FIG. 2, a high-level overview of one or more embodiments of the present invention executed within a modified Open Authorization (OAuth) system 206 is presented.

As shown in steps 1 and 2, a resource owner 200, which is either a human user interfacing with the client device 223 via a user interface, or a computer used by a user to present initial grant credentials to the client device via an application program interface (API), presents initial grant credentials to the native application 202. Examples of such credentials include, but are not limited to, an authorization code, username and password, etc.

As described in step 2*a* (shown as occurring within client device 223 and in communication with application attestation service server 255, analogous to application attestation service server 155 shown in FIG. 1), the native application 202 sends the initial grant credentials, which were received form the resource owner 200, to the application attestation service server 255. The application attestation service server 255 provides a native application attestation service that validates the native application 202 is unmodified and is running on a legitimate client device 223. It provides a cryptographic proof of this attestation that is included in the payload of step 3*a*.

As shown in step 2*b*, the client device 223 then generates a public/private key pair 204, which is used as described below.

As shown in step 3*a*, the native application 202 sends, to the authorization server 201, the initial authorization grant, the attestation result (generated by the native application attestation service), the public key (generated by the native application 202) and the signature of the initial authorization grant, signed with the corresponding private key, to the authorization server 201.

As shown in step 3*b*, the authorization server verifies the attestation result of the application with the application attestation service. If the attestation is not verified by the attestation service, the registration is aborted.

As shown in step 3*c*, the authorization server 201 verifies the public key with the signature of the initial authorization grant, and stores the public key, which will be used in the steps below for granting access to the computer resource(s) 253.

As shown in step 4, the authorization server 201 generates an initial access token and a refresh token and returns them to the native application. The initial access token allows the native application 202 to access the computer resource(s) 253, and the refresh token allows the authorization server 201 to refresh/renew the access token.

As shown in step 5, the native application 202 uses an access token (i.e., either the initial access token or a new access token, whose generation by the authorization server 201 has been authorized by the refresh token), to access the computer resource(s) 253 by the native application 202 on behalf of the resource owner 200.

Access tokens have a limited validity period (e.g., less than five minutes), and thus need to be periodically refreshed by using a refresh token.

Therefore, and as depicted as step 6, the native application 202 periodically exchanges a current refresh token for a new access token and a new refresh token with the authorization server 201. That is, a refresh token is single-use, so a new refresh token replaces an old/current refresh token. In the request from the native application 202 for the authorization server 201 to generate a new refresh token, the old refresh token is signed with a private key by the native application 202, and the signature is sent to the authorization server 201 as part of the token refresh flow. Thus, the authorization server 201 only generates and returns a new access token and a new refresh token if the signature for the old refresh token is verified with the public key that was received in step 3*a*.

Figure 3:
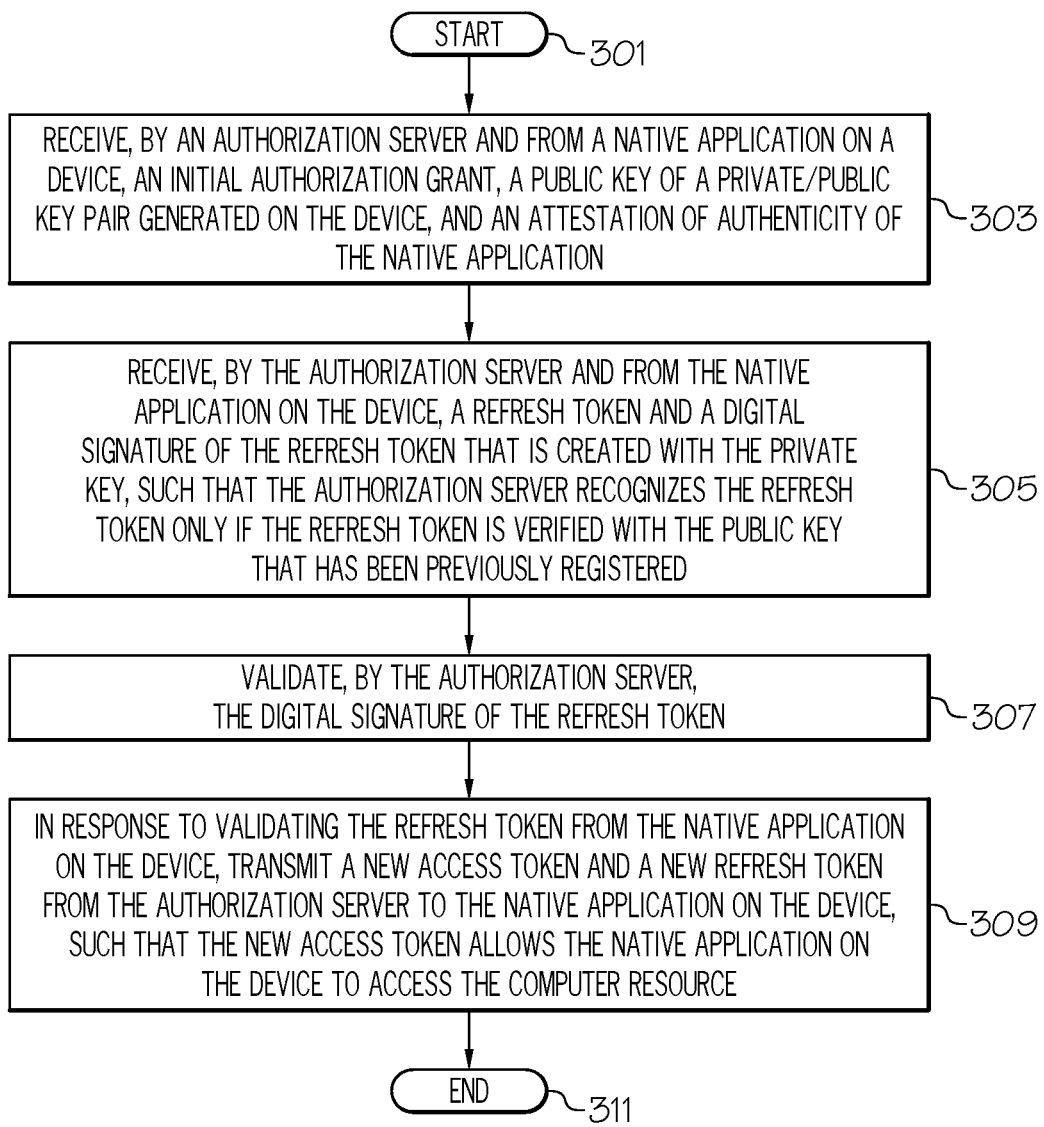
FIG. 3 is a high-level flow-chart of one or more operations performed in one or more embodiments of the present invention.

With reference now to FIG. 3, a high-level flow-chart of one or more operations performed in one or more embodiments of the present invention is presented.

After initiator block 301, an authorization server receives, from a native application on a device, an initial authorization grant, a public key of a private/public key pair generated on the device, and an attestation of authenticity of the native application, as shown in block 303 and described in detail in FIG. 2.

As shown in block 305 and described in detail in FIG. 2, the authorization server receives, from the native application on the device, a refresh token and a digital signature of the refresh token that is created with the private key. In one or more embodiments of the present invention, the authorization server recognizes the refresh token only if the refresh token is verified with the public key that has been previously registered.

As shown in block 307 and described in detail in FIG. 2, the authorization server then validates the digital signature of the refresh token.

As shown in block 309 and described in detail in FIG. 2, in response to validating the refresh token from the native application on the device, the authorization server transmits a new access token and a new refresh token from the authorization server to the native application on the device. This new access token allows the native application on the device to access the computer resource.

The flow-chart ends at terminator block 311.

In one or more embodiments of the present invention, and as described herein, the public/private key is generated on the device, and the private key is protected from unauthorized use or extraction by being device bound to the device. That is, the private key cannot be "hacked" by a malicious actor, since it is only accessible to the client device that generated the public/private key pair.

In one or more embodiments of the present invention, the authorization server and the client are components of an Open Authorization (OAuth) architecture (e.g., modified Open Authorization (OAuth) system 206 shown in FIG. 2), which has been modified by the present invention.

In one or more embodiments of the present invention, a refresh authorization grant is verified to come from the device to which it was issued using data in an application payload from the client without use of a Transport Layer Security (TLS) protocol extension, as described above.

In one or more embodiments of the present invention, one or more processors (e.g., within the authorization server 201 shown in FIG. 2), confirm an identity of the device by applying a Fast Identity Online (FIDO) authentication as part of refresh authorization grant processing. Details of FIDO and/or FIDO2 are described above.

In one or more embodiments of the present invention, the identity of the device is determined and/or confirmed by an identifier of that particular device, such as an Internet Protocol (IP) address used by that particular device and identified by a lookup table that associates that particular device with a particular IP address; a Media Access Control (MAC) that is assigned to a network interface controller for use by that particular device as a network address in communications within a network segment; a Uniform Universal Identifier (UUID) that that has been generated for and is specific for that particular device; etc.

As such, and in one or more embodiments of the present invention, the authorization server validates the refresh token from the native application on the device only if the refresh token came from a particular device that created the initial authorization grant and the public key of a private/public key pair. The authorization server, in one or more embodiments of the present invention, identifies that particular device by the IP address currently being used by the particular device, the MAC address currently being used by the particular device, the UUID of the particular device, etc., which is part of a header that is sent to the authorization server from that particular device when that particular device sends to the authorization server, the initial authorization grant, the public key of a private/public key pair generated on the device, the attestation of authenticity of the native application, and the refresh token.

Therefore, in one or more embodiments of the present invention, the authorization server validates the refresh token from the native application on the device only if the refresh token came from a particular device that created the initial authorization grant and the public key of a private/public key pair, without regard to which application, within that device or within another device, sent the refresh token, the initial authorization grant, and/or the public key of a private/public key pair to the authorization server.

In one or more embodiments of the present invention, a blockchain system is used to ensure that data/elements/factors used by the authorization server 201 shown in FIG. 2 to generate access tokens and/or refresh tokens are valid by storing such data/elements/factors in a blockchain ledger.

Figure 4:
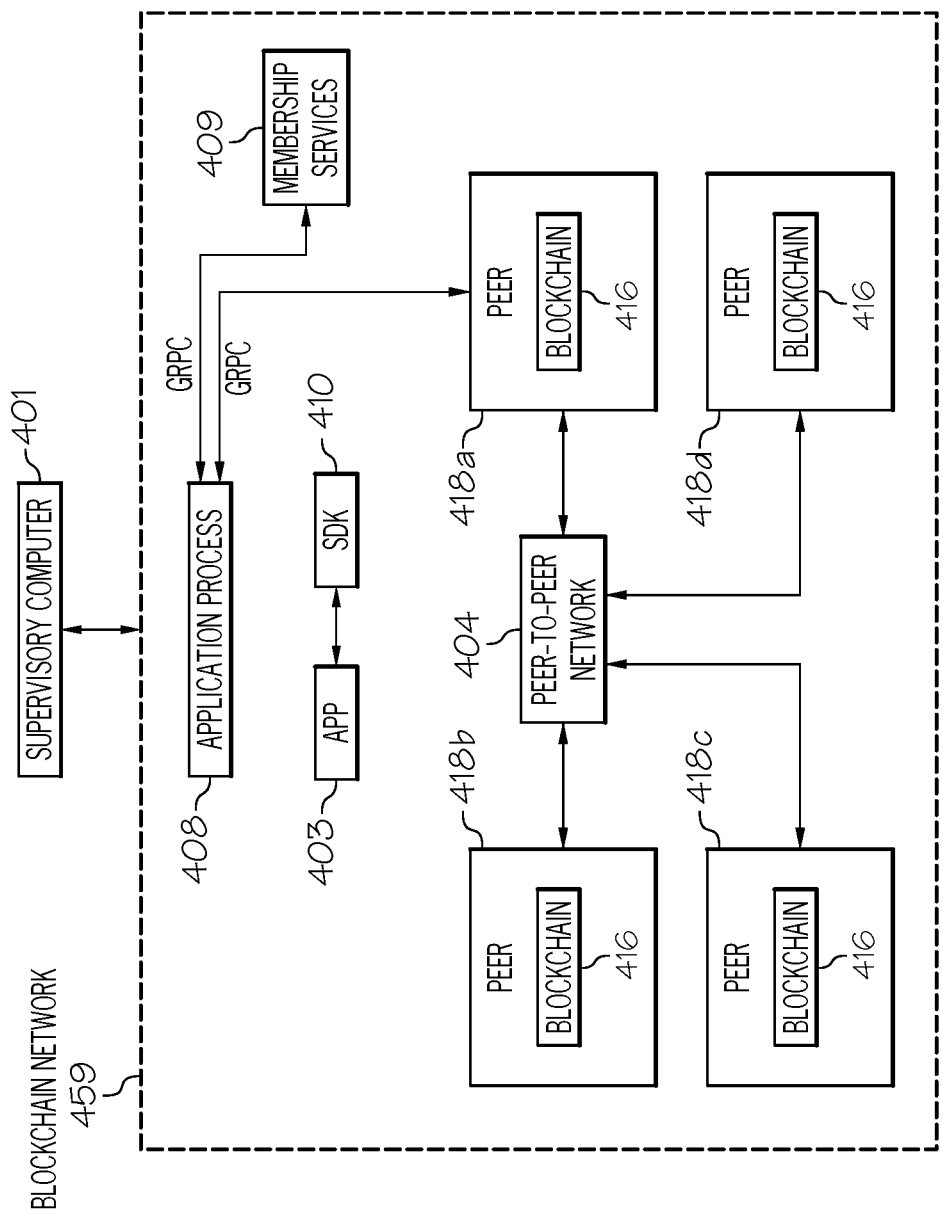
FIG. 4 illustrates an exemplary blockchain network depicted utilized in one or more embodiments of the present invention.

Thus, with reference to FIG. 4, in one or more embodiments of the present invention a blockchain network 459 (analogous to blockchain network 159 shown in FIG. 1) is used to provide the infrastructure (e.g. execution of the chaincodes) and services (e.g., Membership services such as Identity management) for securely and transparently storing, tracking and managing transactions on a "single point of truth". The blockchain network 459 maintains a verifiable record (of the single point of truth) of every single transaction ever made within the system. Once data are entered onto the blockchain, they can never be erased (immutability) or changed. That is, a change to a record would be regarded as issuing/introducing a new transaction. Prohibition of such thus ensures auditability and verifiability of data.

The blockchain network 459 (also known as a "blockchain fabric", a "blockchain system", an "open blockchain", or a "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public ledger.

When a transaction is executed, its corresponding chaincode is executed by several validating peers of the system. For example, as shown in FIG. 4, peers 418a-418d establish the validity of the transaction parameters and, once they reach consensus, a new block is generated and appended onto the blockchain network. That is, an application process 408 (e.g., the OAuth process performed in authentication server 201, as described in FIG. 2) running on a supervisory computer 401 (e.g., authentication server 201 shown in FIG. 2 and/or server 101 shown in FIG. 1) executes an application such as the depicted App 403 (e.g., a OAuth application), causing a software development kit (SDK) 410 to communicate using general remote procedure calls (grpc) to membership services 409 that support the peer-to-peer network 404, which supports the blockchain 416 using the peers 418a-418d.

Figure 5:
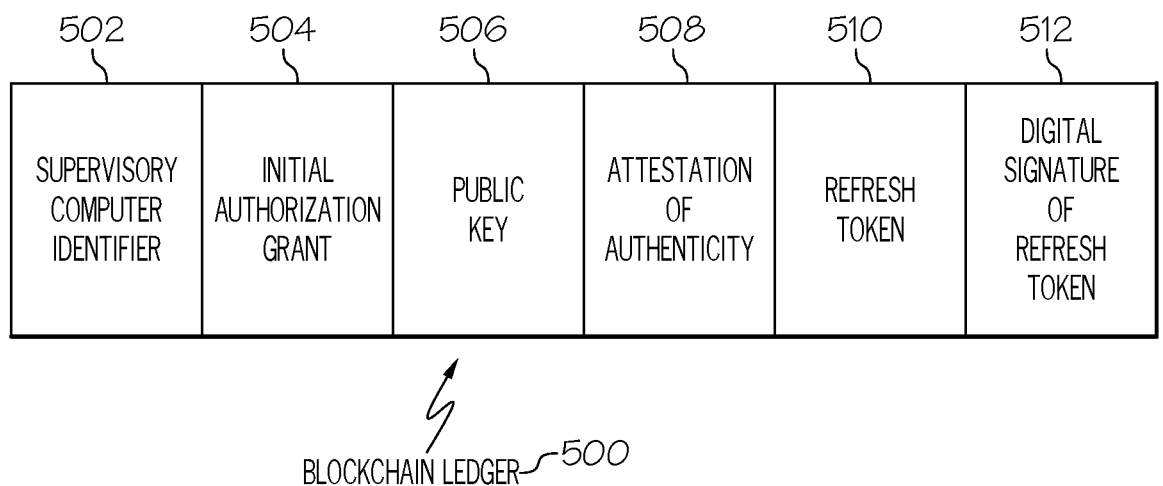
FIG. 5 depicts an exemplary blockchain ledger as used in one or more embodiments of the present invention.

With reference now to FIG. 5, an exemplary blockchain ledger 500 within blockchain 416 as utilized in one or more embodiments of the present invention is depicted.

In one or more embodiments of the present invention, blockchain ledger 500 includes an identifier of the supervisory computer (shown in block 502), such as authentication server 201 shown in FIG. 2 and/or server 101 shown in FIG. 1, that also supports and/or utilizes the peer-to-peer network 404 shown in FIG. 4. For example, in one or more embodiments of the present invention, block 502 includes an internet protocol (IP) address, a uniform resource locator (URL), etc. of the supervisory computer. This information is used by peers in the peer-to-peer network 404 shown in FIG. 4 to receive transactions related to the process flow described herein.

In one or more embodiments of the present invention, blockchain ledger 500 also includes a copy of the initial authorization grant (block 504), the public key (block 506), the attestation of authenticity of the native application (block 508), the refresh token (block 510), and the digital signature of the refresh token (block 512) that are utilized by the authentication server to generate a first new access token and a first new refresh token. Thereafter, the information from the blockchain ledger 500 is retrieved, in a form that is ensured to be unchanged since it was initially presented to (although not necessarily used by) the authentication server. That is, as the initial authorization grant, public key of a private/public key pair generated on the device, and attestation of authenticity of the native application are created, they are sent in parallel to both the authorization server and the blockchain. However, there is a chance that the initial authorization grant, public key of a private/public key pair generated on the device, and attestation of authenticity of the native application are corrupted before they are used by the authorization server. As such, an uncorrupted version of the initial authorization grant, public key of a private/public key pair generated on the device, and attestation of authenticity of the native application are stored on the blockchain, where they are stored in a blockchain system that prevents any data corruption.

Figure 6:
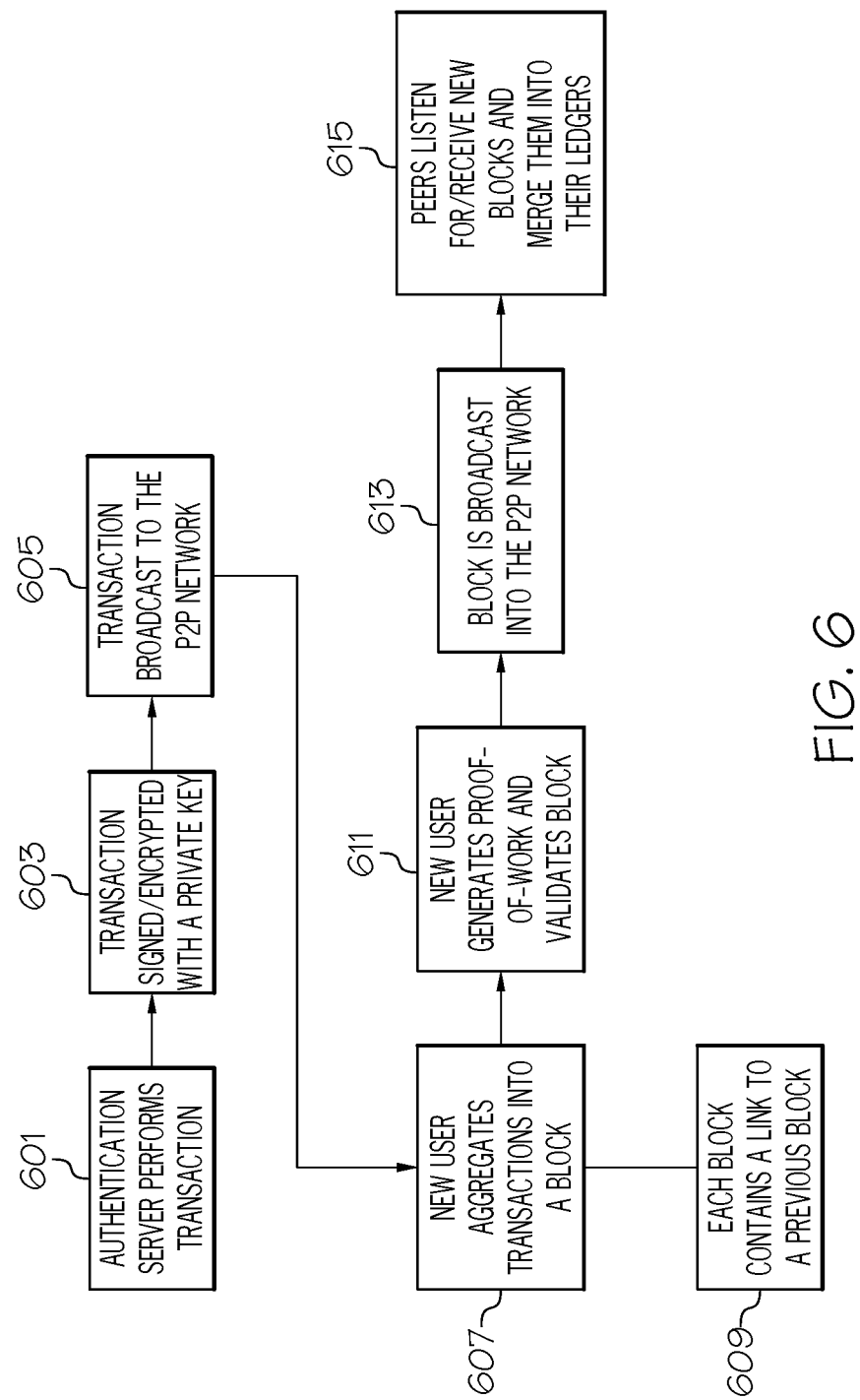
FIG. 6 illustrates a high-level set of operations using a blockchain in accordance with one or more embodiments of the present invention.

Exemplary operation of the blockchain network 459 shown in FIG. 4 is presented in FIG. 6. As described in step 601, a computing device (e.g., supervisory computer 401 shown in FIG. 4, which in one or more embodiments is the server 101 shown in FIG. 1 and/or the authorization server 201 shown in FIG. 2) performs a transaction (e.g., receiving a native application on a device, an initial authorization grant, a public key of a private/public key pair generated on the device, an attestation of authenticity of the native application, a refresh token, a digital signature of the refresh token that is created with the private key, etc. as described above in FIG. 2). As shown in step 603, the supervisory computer 401 hashes the transaction with a hash algorithm, such as Secure Hash Algorithm (SHA-2) and then signs the hash with a digital signature. This signature is then broadcast to the peer-to-peer network 404 shown in FIG. 4, as described in step 605. A peer in the peer-to-peer network 404

(e.g., peer 418*a*) aggregates the transaction(s) into blockchain 416 shown in FIG. 4, as shown in step 607. As shown in block 609, each block contains a link to a previous block. The newly-revised blockchain 416 is validated by one or more of the other peers in peers 418*a*-418*d* and/or by other peers from other authorized blockchain systems (step 611). The validated block is then broadcast to the peers 418*b*-418*d*, as described in step 613. These peers 418*b*-418*d* listen for and receive the new blocks and merge them into their copies of blockchain 416 (step 615).

Thus, the blockchain fabric described in FIG. 4 through FIG. 6 describe a blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

As such, a blockchain fabric uses a distributed network to maintain a digital ledger of events, thus providing excellent security for the digital ledger, since the blockchain stored in each peer is dependent upon earlier blocks, which provide protected data for subsequent blocks in the blockchain.

That is, the blockchain fabric described herein provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., hashed) based on one or more previous blocks.

Thus, in one or more embodiments of the present invention, assume that the new access token described above in FIG. 3 is identified as a first new access token and the new refresh token is identified as a first new refresh token.

In one or more embodiments of the present invention, a blockchain architecture (e.g., server 101 shown in FIG. 1 and/or authorization server 201 shown in FIG. 2 and/or supervisory computer 401 and/or blockchain network 459 shown in FIG. 4) stores a stored blockchain that includes the initial authorization grant, the public key, the attestation of authenticity of the native application, the refresh token, and the digital signature of the refresh token that are utilized by the authentication server to generate the first new access token and the first new refresh token.

The supervisory computer (e.g., authorization server 201) retrieves the stored blockchain from the blockchain architecture, and generates a second new access token and a second new refresh token by using the initial authorization grant, the public key, the attestation of authenticity of the native application, the refresh token, and the digital signature of the refresh token from the stored blockchain.

One or more processors compare the first new access token and the first new refresh token to the second new access token and the second new refresh token in order to determine that the first new access token and the first new refresh token match the second new access token and the second new refresh token.

In response to determining that the first new access token and the first new refresh token match the second new access token and the second new refresh token, one or more processors authorizing the first new access token and the first new refresh token generated by the authorization server to be transmitted from the authorization server to the native application.

In one or more embodiments of the present invention, the new access token is a first new access token and the new refresh token is a first new refresh token; the blockchain just described includes the initial authorization grant, the public key, the attestation of authenticity of the native application, the refresh token, and the digital signature of the refresh token that are utilized by the authentication server to generate the first new access token and the first new refresh token; the stored blockchain is retrieved from the blockchain architecture; the authentication server generates a second new access token and a second new refresh token by using the initial authorization grant, the public key, the attestation of authenticity of the native application, the refresh token, and the digital signature of the refresh token from the stored blockchain.

However, in these one or more embodiments, one or more processors compare the first new access token and the first new refresh token to the second new access token and the second new refresh token in order to determine that the first new access token and the first new refresh token do not match the second new access token and the second new refresh token. As such, and in response to determining that the first new access token and the first new refresh token do not match the second new access token and the second new refresh token, one or more processors block transmission of the first new access token and the first new refresh token generated by the authorization server from the authorization server to the native application.

Thus, the contents of the blockchain are used to confirm that the initial authorization grant, the public key, the attestation of authenticity of the native application, the refresh token, and the digital signature of the refresh token that are utilized by the authentication server to generate the first new access token and the first new refresh token are valid, as guaranteed by their earlier storage in the blockchain.

In one or more embodiments of the present invention, artificial intelligence (e.g., a neural network) is used to validate the access token and the refresh token that the authorization server generates.

Figure 7:
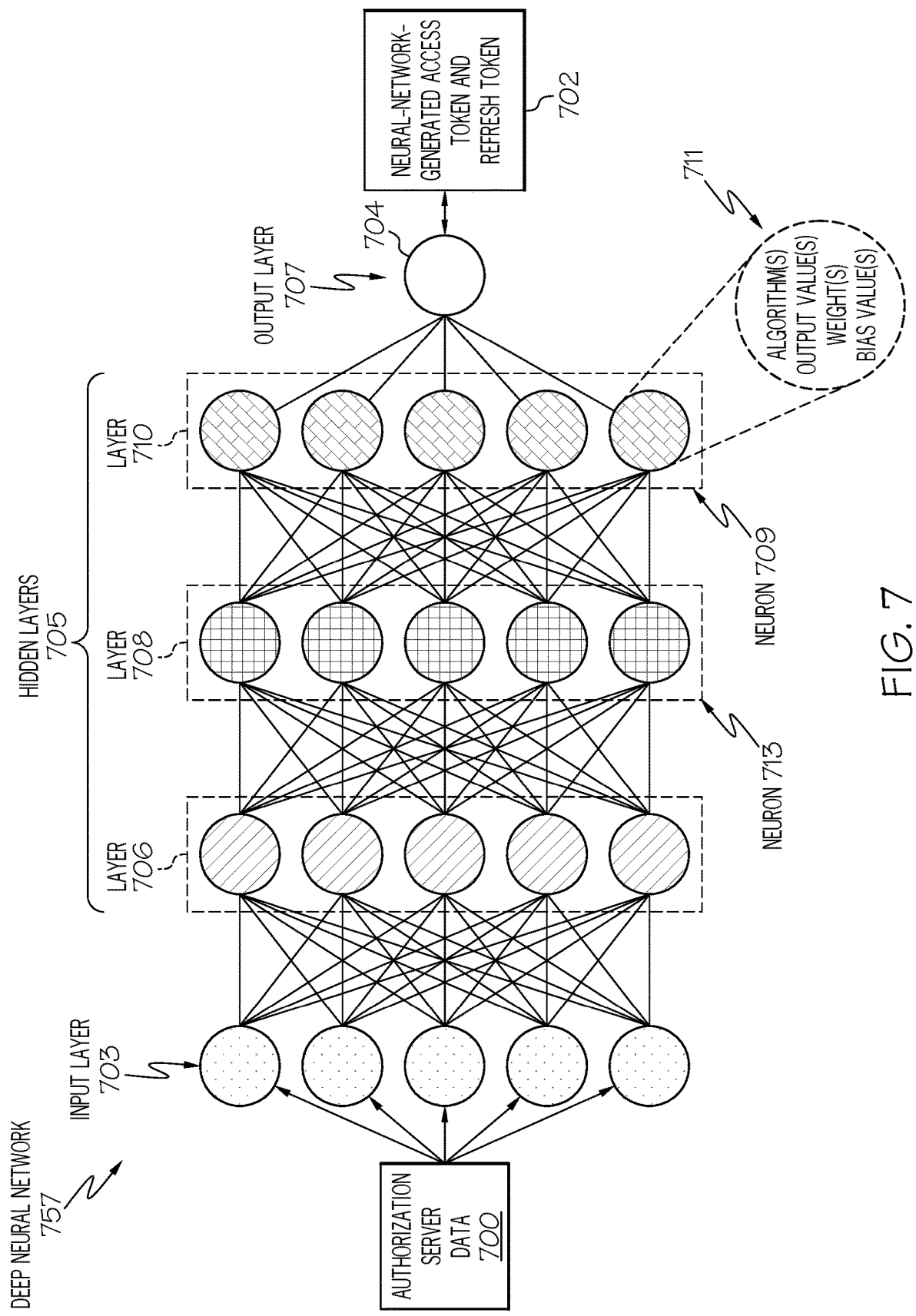
FIG. 7 illustrates an exemplary neural network as used in one or more embodiments of the present invention.

With reference then to FIG. 7, an exemplary artificial intelligence system used in one or more embodiments of the present invention is a deep neural network (DNN) 757 (analogous to artificial intelligence system 157 shown in FIG. 1) as utilized in one or more embodiments of the present invention is presented. The nodes within DNN 757 represent hardware processors, virtual processors, software algorithms, or a combination of hardware processors, virtual processors, and/or software algorithms.

In one or more embodiments of the present invention, DNN 757 is trained to generate a neural-network-generated access token and/or a neural-network-generated refresh token, as shown in block 702.

DNN 757 has been trained to use authorization server data 700 (e.g., the initial authorization grant, the public key, the attestation of authenticity of the native application, the refresh token, and the digital signature of the refresh token that are utilized by the authentication server to generate the new access token and the new refresh token) to generate a neural-network-generated access token and/or a neural-network-generated refresh token, as shown in block 702. DNN 757 is trained by using various known types of initial authorization grants, types of public keys, types of attestations of authenticity of the native application, types of refresh token, and types of digital signatures of the refresh token used to generate known neural-network-generated access tokens and/or a neural-network-generated refresh tokens.

DNN 757 is an exemplary type of neural network used in one or more embodiments of the present. Other neural networks that can be used in one or more embodiments of the present invention include convolutional neural networks (CNNs) and neural networks that use other forms of deep learning.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

The electronic neurons (also referred to herein simply as "neurons" or "nodes") in DNN 757 are arranged in layers, known as an input layer 703, hidden layers 705, and an output layer 707. The input layer 703 includes neurons/nodes that take input data, and send it to a series of hidden layers of neurons (e.g., hidden layers 705), in which neurons from one layer in the hidden layers are interconnected with all neurons in a next layer in the hidden layers 705. The final layer in the hidden layers 705 then outputs a computational result to the output layer 707, which is often a single node for holding vector information.

As just mentioned, each node in the depicted DNN 757 represents an electronic neuron, such as the depicted neuron 709. As shown in block 711, each neuron (including neuron 709) functionally includes at least four features: an algorithm, an output value, a weight, and a bias value.

The algorithm is a mathematic formula for processing data from one or more upstream neurons. For example, assume that one or more of the neurons depicted in the middle hidden layers 705 send data values to neuron 709. Neuron 709 then processes these data values by executing the mathematical function shown in block 711, in order to create one or more output values, which are then sent to another neuron, such as another neuron within the hidden layers 705 or a neuron in the output layer 707. Each neuron also has a weight that is specific for that neuron and/or for other connected neurons. Furthermore, the output value(s) are added to bias value(s), which increase or decrease the output value, allowing the DNN 757 to be further "fine-tuned".

For example, assume that neuron 713 is sending the results of its analysis of a piece of data to neuron 709. Neuron 709 has a first weight that defines how important data coming specifically from neuron 713 is. If the data is important, then data coming from neuron 713 is weighted heavily, and/or increased by the bias value, thus causing the mathematical function (s) within neuron 709 to generate a higher output, which will have a heavier impact on neurons in the output layer 707. Similarly, if neuron 713 has been determined to be significant to the operations of neuron 709, then the weight in neuron 713 will be increased, such that neuron 709 receives a higher value for the output of the mathematical function in the neuron 713. Alternatively, the output of neuron 709 can be minimized by decreasing the weight and/or bias used to affect the output of neuron 709. These weights/biases are adjustable for one, some, or all of the neurons in the DNN 757, such that a reliable output will result from output layer 707. In one or more embodiments of the present invention, finding the values of weights and bias values is done automatically by training the neural network. In one or more embodiments of the present invention, manual adjustments are applied to tune hyperparameters such as learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted during the training of DNN 757, the weights are adjusted in a repeated manner until the output from output layer 707 matches expectations.

When automatically adjusted, the weights (and/or mathematical functions) are adjusted using "back propagation", in which weight values of the neurons are adjusted by using a "gradient descent" method that determines which direction each weight value should be adjusted to. This gradient descent process moves the weight in each neuron in a certain direction until the output from output layer 707 improves (e.g., accurately generates appropriate access tokens and refresh tokens).

As shown in FIG. 7, various layers of neurons are shaded differently, indicating that, in one or more embodiments of the present invention, they are specifically trained for recognizing different aspects of information used by an authentication server when generating refresh tokens.

Thus, in one or more embodiments of the present invention, within the hidden layers 705 are layer 706, which contains neurons that are designed to evaluate types of authorization grants; layer 708, which contains neurons that are designed to evaluate types of public keys; and layer 710, which contains neurons that are designed to evaluate types of attestation of authenticity of native applications.

The outputs of neurons from layer 710 then control the value found in output layer 707.

Thus, one or more embodiments of the present invention input, into a neural network, the initial authorization grant, the public key, the attestation of authenticity of the native application, the refresh token, and the digital signature of the refresh token, where the neural network is trained to generate a neural-network-generated access token and a neural-network-generated refresh token. One or more processors then compare the new access token and the new refresh token that are generated by the authorization server to the neural-network-generated access token and the neural-network-generated refresh token in order to validate the new access token and new refresh token that is generated by the authorization server.

In one or more embodiments of the present invention, one or more processors determine that the new access token and new refresh token match the neural-network-generated access token and the neural-network-generated refresh token. In response to determining that the new access token and new refresh token match the neural-network-generated access token and the neural-network-generated refresh token, one or more processors transmit the new access token and the new refresh token to the native application.

In one or more embodiments of the present invention, one or more processors determine that the new access token and new refresh token do not match the neural-network-generated access token and the neural-network-generated refresh token. In response to determining that the new access token and new refresh token do not match the neural-network-generated access token and the neural-network-generated refresh token, one or more processors block transmission of the new access token and the new refresh token to the native application.

Thus, in one or more embodiments of the present invention, the neural network either validates or invalidates the work performed by the authentication server described above.

As such, and as described in various embodiments presented herein, the attestation of authenticity of the native application guarantees an integrity and authenticity of the native application and device.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
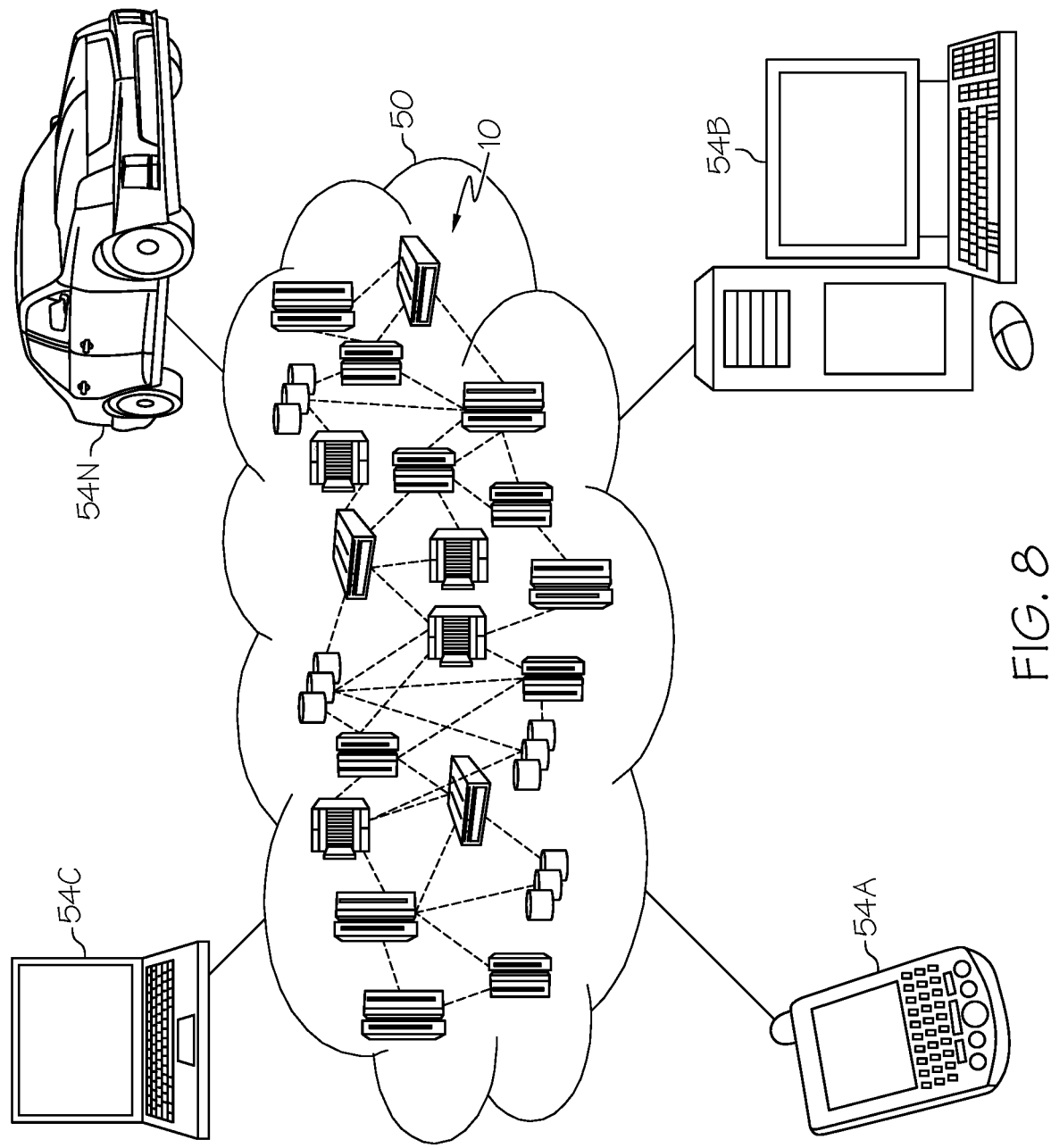
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
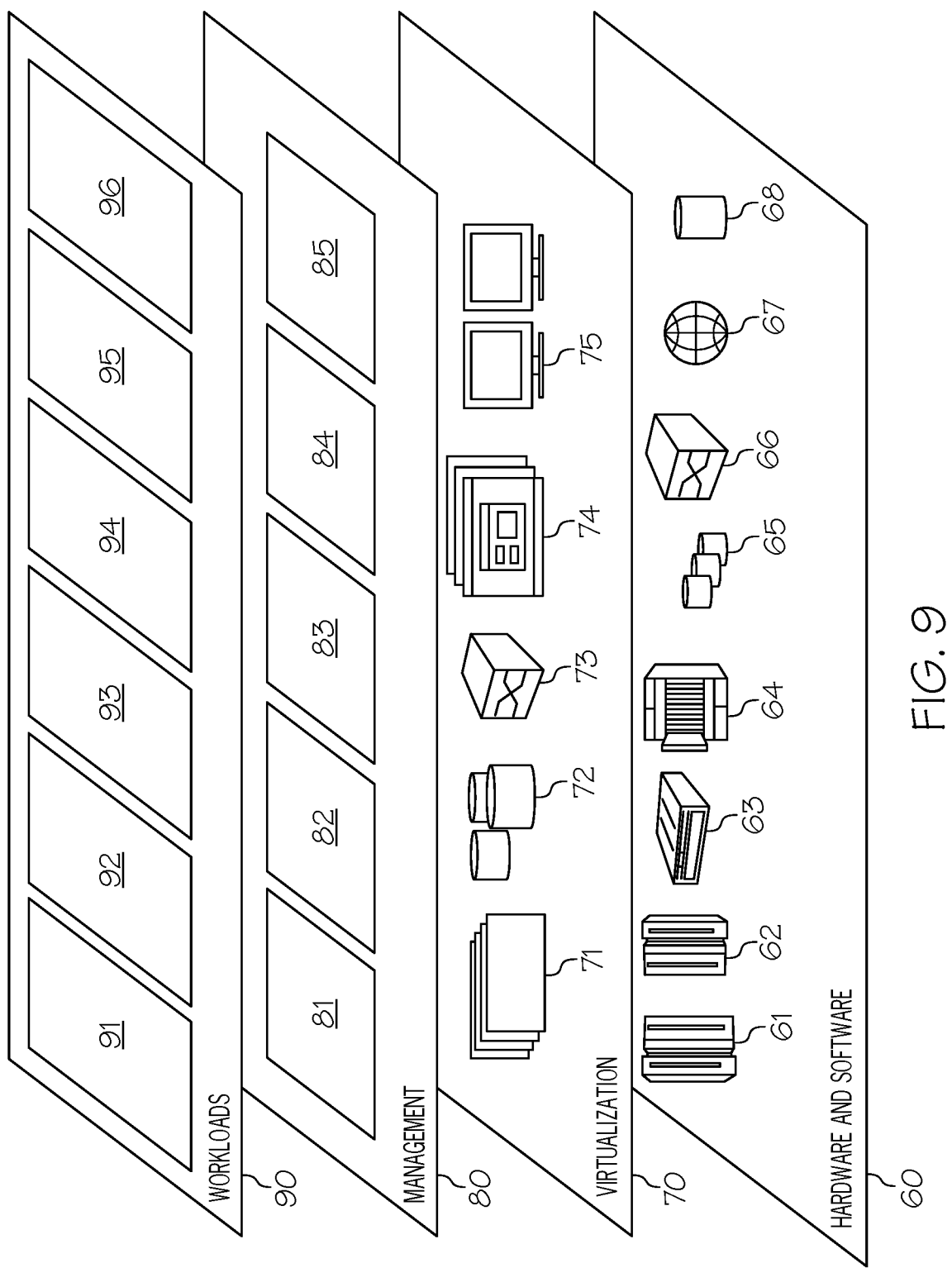
FIG. 9 depicts abstraction model layers of a cloud computer environment according to an embodiment of the present invention.

Referring now to FIG. 9, a set of functional abstraction layers provided by cloud computing environment 50 (FIG. 9) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and secure computer resource access processing 96, which performs one or more of the features of the present invention described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    receiving, by an authorization server and from a native application on a device, an initial authorization grant, a public key of a private/public key pair generated on the device, and an attestation of authenticity of the native application;
    receiving, by the authorization server and from the native application on the device, a refresh token and a digital signature of the refresh token that is created with the private key, wherein the authorization server recognizes the refresh token only if the refresh token is verified with the public key that has been previously registered;
    validating, by the authorization server, the digital signature of the refresh token;
    in response to validating the refresh token from the native application on the device, transmitting, by the authorization server, a new access token and a new refresh token from the authorization server to the native application on the device, wherein the new access token allows the native application on the device to access the computer resource;
    inputting, into a neural network, the initial authorization grant, the public key, the attestation of authenticity of the native application, the refresh token, and the digital signature of the refresh token, wherein the neural network is trained to generate a neural-network-generated access token and a neural-network-generated refresh token; and
    comparing, by one or more processors, the new access token and the new refresh token that are generated by the authorization server to the neural-network-generated access token and the neural-network-generated refresh token in order to validate the new access token and new refresh token that is generated by the authorization server.

2. The method of claim 1, wherein the attestation of authenticity of the native application guarantees an integrity and authenticity of the native application and device.

3. The method of claim 1, wherein the public/private key is generated on the device, and wherein the private key is protected from unauthorized use or extraction by being device bound to the device.

4. The method of claim 1, wherein the authorization server and the client are components of an Open Authorization (OAuth) architecture.

5. The method of claim 1, wherein a refresh authorization grant is verified to come from the device to which it was issued using data in an application payload from the client without use of a Transport Layer Security (TLS) protocol extension.

6. The method of claim 1, further comprising:
confirming, by one or more processors, an identity of the device by applying a Fast Identity Online (FIDO) authentication as part of refresh authorization grant processing.

7. The method of claim 1, further comprising:
determining, by one or more processors, that the new access token and new refresh token match the neural-network-generated access token and the neural-network-generated refresh token; and
in response to determining that the new access token and new refresh token match the neural-network-generated access token and the neural-network-generated refresh token, transmitting, by one or more processors, the new access token and the new refresh token to the native application.

8. The method of claim 1, further comprising:
determining, by one or more processors, that the new access token and new refresh token do not match the neural-network-generated access token and the neural-network-generated refresh token; and
in response to determining that the new access token and new refresh token do not match the neural-network-generated access token and the neural-network-generated refresh token, blocking, by one or more processors, transmission of the new access token and the new refresh token to the native application.

9. The method of claim 1, wherein the new access token is a first new access token and the new refresh token is a first new refresh token, and wherein the method further comprises:
storing, in a blockchain architecture, a stored blockchain that comprises the initial authorization grant, the public key, the attestation of authenticity of the native application, the refresh token, and the digital signature of the refresh token that are utilized by the authentication server to generate the first new access token and the first new refresh token;
retrieving, from the blockchain architecture, the stored blockchain;
generating, by the authentication server, a second new access token and a second new refresh token by using the initial authorization grant, the public key, the attestation of authenticity of the native application, the refresh token, and the digital signature of the refresh token from the stored blockchain;
comparing, by one or more processors, the first new access token and the first new refresh token to the second new access token and the second new refresh token in order to determine that the first new access token and the first new refresh token match the second new access token and the second new refresh token; and
in response to determining that the first new access token and the first new refresh token match the second new access token and the second new refresh token, authorizing, by one or more processors, the first new access token and the first new refresh token generated by the authorization server to be transmitted from the authorization server to the native application.

10. The method of claim 1, wherein the new access token is a first new access token and the new refresh token is a first new refresh token, and wherein the method further comprises:
storing, in a blockchain architecture, a stored blockchain that comprises the initial authorization grant, the public key, the attestation of authenticity of the native application, the refresh token, and the digital signature of the refresh token that are utilized by the authentication server to generate the first new access token and the first new refresh token;
retrieving, from the blockchain architecture, the stored blockchain;
generating, by the authentication server, a second new access token and a second new refresh token by using the initial authorization grant, the public key, the attestation of authenticity of the native application, the refresh token, and the digital signature of the refresh token from the stored blockchain;
comparing, by one or more processors, the first new access token and the first new refresh token to the second new access token and the second new refresh token in order to determine that the first new access token and the first new refresh token do not match the second new access token and the second new refresh token; and
in response to determining that the first new access token and the first new refresh token do not match the second new access token and the second new refresh token, blocking, by one or more processors, transmission of the first new access token and the first new refresh token generated by the authorization server from the authorization server to the native application.

11. A computer program product comprising a computer readable storage medium having program code embodied therewith, wherein the computer readable storage medium is not a transitory signal per se, and wherein the program code is readable and executable by a processor to perform a method comprising:
receiving, from a native application on a device, an initial authorization grant, a public key of a private/public key pair generated on the device, and an attestation of authenticity of the native application;
receiving, from the native application on the device, a refresh token and a digital signature of the refresh token that is created with the private key, wherein the authorization server recognizes the refresh token only if the refresh token is verified with the public key that has been previously registered;
validating the digital signature of the refresh token; and
in response to validating the refresh token from the native application on the device, transmitting a new access token and a new refresh token from the authorization server to the native application on the device, wherein the new access token allows the native application on the device to access the computer resource;
wherein:
the new access token is a first new access token and the new refresh token is a first new refresh token; and
the method further comprises:
storing, in a blockchain architecture, a stored blockchain that comprises the initial authorization grant, the public key, the attestation of authenticity of the native application, the refresh token, and the digital signature of the refresh token that are utilized by the authentication server to generate the first new access token and the first new refresh token;
retrieving, from the blockchain architecture, the stored blockchain;
generating, by the authentication server, a second new access token and a second new refresh token by using the initial authorization grant, the public key, the attestation of authenticity of the native application, the refresh token, and the digital signature of the refresh token from the stored blockchain;

comparing, by one or more processors, the first new access token and the first new refresh token to the second new access token and the second new refresh token in order to determine that the first new access token and the first new refresh token match the second new access token and the second new refresh token; and in response to determining that the first new access token and the first new refresh token match the second new access token and the second new refresh token, authorizing, by one or more processors, the first new access token and the first new refresh token generated by the authorization server to be transmitted from the authorization server to the native application.

12. The computer program product of claim 11, wherein the attestation of authenticity of the native application guarantees an integrity and authenticity of the native application and device.

13. The computer program product of claim 11, wherein the public/private key is generated on the device, and wherein the private key is protected from unauthorized use or extraction by being device bound to the device.

14. The computer program product of claim 11, wherein the authorization server and the client are components of an Open Authorization (OAuth) architecture.

15. The computer program product of claim 11, wherein a refresh authorization grant is verified to come from the device to which it was issued using data in an application payload from the client without use of a Transport Layer Security (TLS) protocol extension.

16. The computer program product of claim 11, wherein the program code is provided as a service in a cloud environment.

17. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving, from a native application on a device, an initial authorization grant, a public key of a private/public key pair generated on the device, and an attestation of authenticity of the native application;

receiving, from the native application on the device, a refresh token and a digital signature of the refresh token that is created with the private key, wherein the authorization server recognizes the refresh token only if the refresh token is verified with the public key that has been previously registered;

validating the digital signature of the refresh token; and in response to validating the refresh token from the native application on the device, transmitting a new access token and a new refresh token from the authorization server to the native application on the device, wherein the new access token allows the native application on the device to access the computer resource;

wherein:
the new access token is a first new access token and the new refresh token is a first new refresh token; and
the method further comprises:

storing, in a blockchain architecture, a stored blockchain that comprises the initial authorization grant, the public key, the attestation of authenticity of the native application, the refresh token, and the digital signature of the refresh token that are utilized by the authentication server to generate the first new access token and the first new refresh token;

retrieving, from the blockchain architecture, the stored blockchain;

generating, by the authentication server, a second new access token and a second new refresh token by using the initial authorization grant, the public key, the attestation of authenticity of the native application, the refresh token, and the digital signature of the refresh token from the stored blockchain;

comparing, by one or more processors, the first new access token and the first new refresh token to the second new access token and the second new refresh token in order to determine that the first new access token and the first new refresh token do not match the second new access token and the second new refresh token; and in response to determining that the first new access token and the first new refresh token do not match the second new access token and the second new refresh token, blocking, by one or more processors, transmission of the first new access token and the first new refresh token generated by the authorization server from the authorization server to the native application.

18. The computer system of claim 17, wherein the authorization server and the client are components of an Open Authorization (OAuth) architecture, and wherein a refresh authorization grant is verified to come from the device to which it was issued using data in an application payload from the client without use of a Transport Layer Security (TLS) protocol extension.

19. The computer system of claim 17, wherein the stored program instructions are provided as a service in a cloud environment.

* * * * *